United States Patent
Cathaud et al.

(10) Patent No.: US 10,602,717 B2
(45) Date of Patent: Mar. 31, 2020

(54) COMB FOR A BRUSH FOR GROOMING ANIMAL FUR

(71) Applicant: SSERTSON GROUP, Saint-Romain le Puy (FR)

(72) Inventors: Eddy Cathaud, L'Hôpital le Grand (FR); Jacqueline Jeanne Clémence Berger, Veauche (FR); Xavier Debiaune, Saint Just Saint Rambert (FR)

(73) Assignee: SSERTSON GROUP, Saint-Romain le Puy (FR)

( * ) Notice: Subject to any disclaimer, the term of this patent is extended or adjusted under 35 U.S.C. 154(b) by 250 days.

(21) Appl. No.: 15/502,785

(22) PCT Filed: Jul. 15, 2015

(86) PCT No.: PCT/EP2015/066116
§ 371 (c)(1),
(2) Date: Feb. 9, 2017

(87) PCT Pub. No.: WO2016/023699
PCT Pub. Date: Feb. 18, 2016

(65) Prior Publication Data
US 2017/0231192 A1 Aug. 17, 2017

(30) Foreign Application Priority Data
Aug. 9, 2014 (FR) ..................................... 14 57732

(51) Int. Cl.
*A01K 13/00* (2006.01)
*A45D 24/04* (2006.01)
*A45D 24/30* (2006.01)

(52) U.S. Cl.
CPC ............ *A01K 13/002* (2013.01); *A45D 24/04* (2013.01); *A45D 24/30* (2013.01)

(58) Field of Classification Search
CPC ...... A01K 13/002; A45D 24/02; A45D 24/04; A45D 24/30
(Continued)

(56) References Cited

U.S. PATENT DOCUMENTS 1,058,705 A * 4/1913 Guttinger ............. A01K 13/002
119/632
2,175,344 A * 10/1939 Friedman ............... A45D 24/00
132/137
(Continued)

FOREIGN PATENT DOCUMENTS

DE 219426 2/1910

OTHER PUBLICATIONS

International Search Report PCT/EP2015/066116 dated Oct. 28, 2015.

*Primary Examiner* — Christopher D Hutchens
(74) *Attorney, Agent, or Firm* — Young & Thompson

(57) ABSTRACT

Disclosed is a comb having a lamellar body and including, along a toothed edge, teeth able to penetrate the coat of hair. The comb eliminates injuries caused to the animal by sharp teeth, eliminating fur damage while also improving the treatment of the hair coat and to improve brushing performance by adapting to the hair coat of each animal, in each season. To this end, the teeth of the two sets of teeth A and B, which are positioned one on each side of the mid plane P of the body and the teeth of which sets are intercalated with one another, have anti-injury roundings at the tips and over part of the length of the edge corners leading from these tips and are delimited between a flat external face and a curved extreme internal face, the tooth set B being finer and provided with shorter teeth.

12 Claims, 4 Drawing Sheets

(58) Field of Classification Search
USPC .................................................. D28/21, 28
See application file for complete search history.

(56) References Cited

U.S. PATENT DOCUMENTS

| | | | | |
|---|---|---|---|---|
| 2,205,200 | A | * | 6/1940 | Huppert ................. A45D 24/02 132/142 |
| 3,181,540 | A | * | 5/1965 | Abraham ............... A45D 24/02 132/159 |
| 3,669,130 | A | * | 6/1972 | Petroczky ............. A45D 24/02 132/138 |
| 4,984,590 | A | * | 1/1991 | Bachtell ................. A45D 24/02 132/150 |
| D330,781 | S | * | 11/1992 | Balster ........................... D28/25 |
| D472,016 | S | * | 3/2003 | Kim ................................ D28/25 |
| 6,782,846 | B1 | * | 8/2004 | Porter ................. A01K 13/002 119/611 |
| D496,128 | S | * | 9/2004 | Antonopoulos ............... D28/21 |
| D671,680 | S | * | 11/2012 | Ramirez ........................ D28/30 |
| D719,295 | S | * | 12/2014 | Hsu ........................ A45D 24/00 D28/21 |
| 9,226,570 | B2 | * | 1/2016 | Pulfrey .................. A46B 9/023 |
| 2006/0178713 | A1 | * | 8/2006 | Maricle ................ A61N 5/0617 607/89 |
| 2009/0272331 | A1 | * | 11/2009 | Lin ....................... A01K 13/002 119/625 |
| 2009/0314305 | A1 | | 12/2009 | Bachrach et al. |
| 2010/0307426 | A1 | * | 12/2010 | Bertsch ................ A01K 13/002 119/601 |
| 2011/0067644 | A1 | | 3/2011 | Prochaska |
| 2011/0259281 | A1 | | 10/2011 | Mak |
| 2012/0111282 | A1 | * | 5/2012 | Dennis ................ A01K 13/002 119/601 |
| 2013/0180464 | A1 | | 7/2013 | Tu |
| 2014/0261227 | A1 | * | 9/2014 | Sullivan ............... A01K 13/002 119/625 |
| 2015/0313342 | A1 | * | 11/2015 | Park ....................... A45D 24/02 132/213.1 |
| 2017/0020108 | A1 | * | 1/2017 | Stevens ................ A01K 13/002 |

* cited by examiner

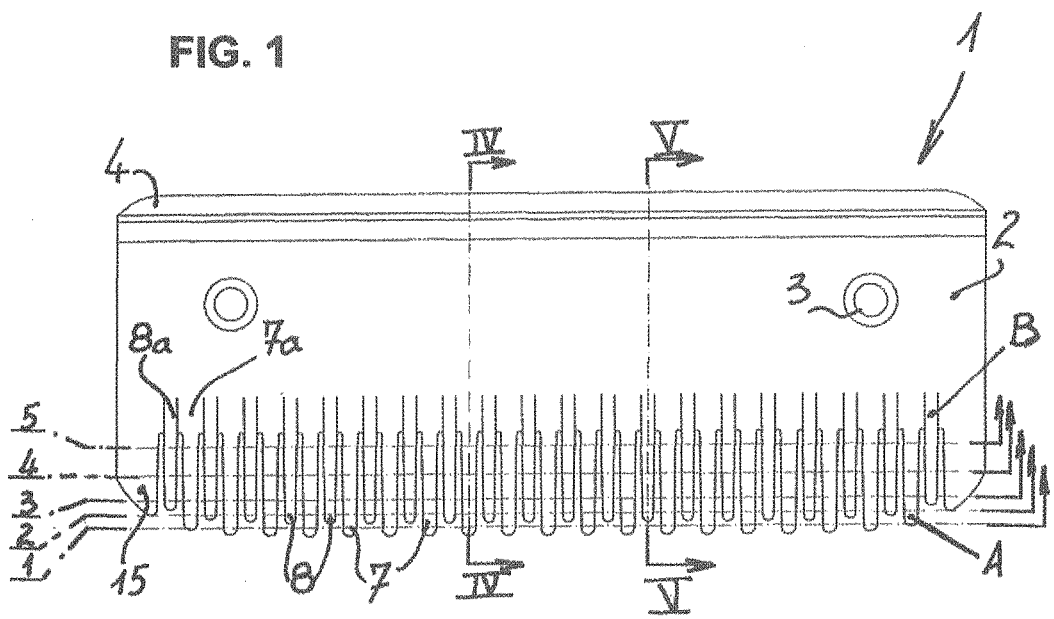
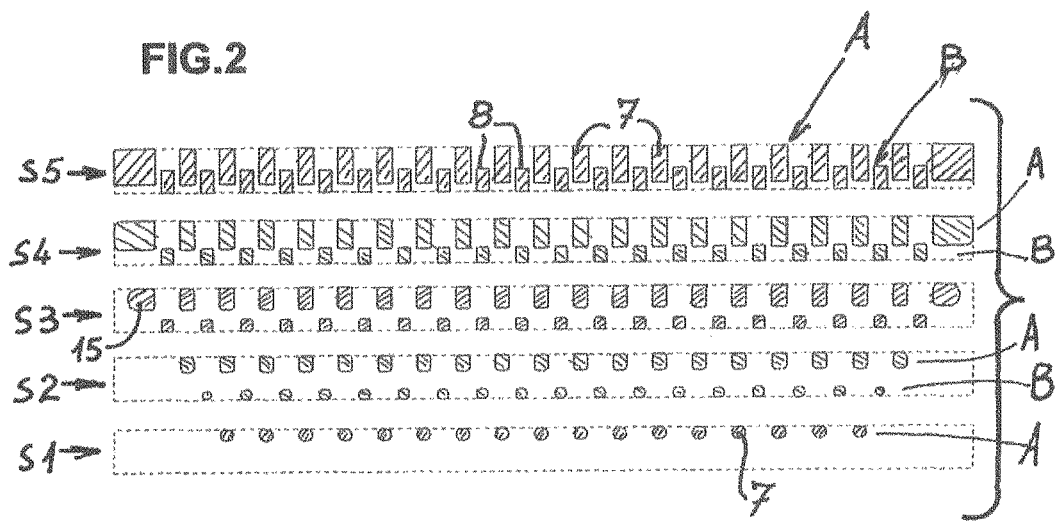
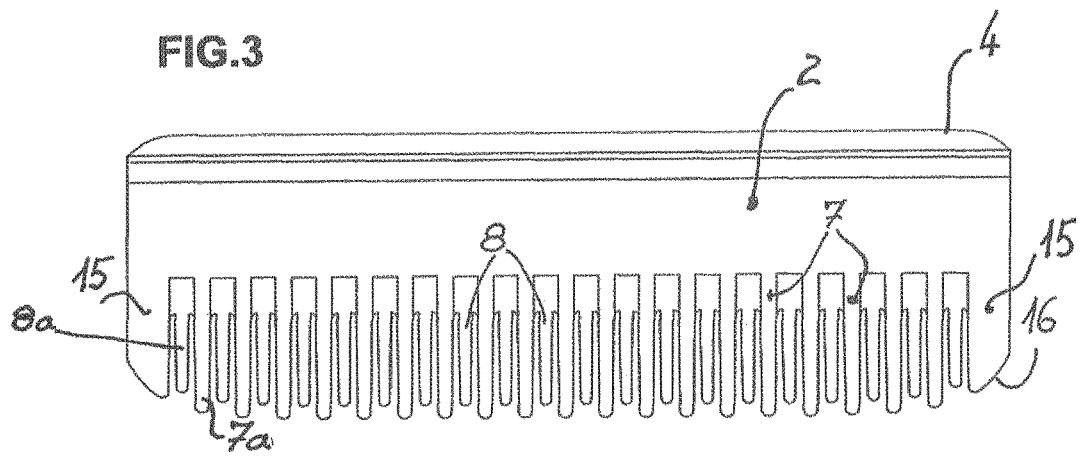

COMB FOR A BRUSH FOR GROOMING ANIMAL FUR

BACKGROUND OF THE INVENTION

Field of the Invention

The invention relates to the grooming of animal fur and more particularly a comb for a manual brush.

Description of the Related Art

In order to maintain the fur of domestic animals, such as dogs and cats, it is known to brush them manually with a brush comprised of a handle with a head for receiving a removable and interchangeable comb. In current brushes the comb is made from a metal blade of which the body is provided with means for fastening to the head of the handle and with a bevelled edge wherein the teeth are carried out by machining.

This solution has been in use for a long time as it gives the teeth a "scraping" power which allows them to remove from the coat of hair dead hairs while still removing the superficial dandruff.

Due to their method of manufacture by machining, these sets of teeth have sharp teeth that can, in the absence of precautions of the person carrying out the grooming, injure the skin of the animal by their cutting power, break the hairs of the fur by the rigidity of the metal comb and, by cutting too many hairs via their sharp edges, to the point of forming bald patches in the fur. In addition, according to the means of machining used, these sets of teeth have "saw tooth" edges that can be seen under a microscope which damage the coat of hair. These same characteristics make it complicated to maintain and clean this tool, which can be unhealthy for the animal.

It is known from document US2011/0259281 a comb for a manual brush for grooming the coat of hair of animals made from a blade of which the body is provided with means for fastening on a brushing support with a handle. This blade comprises on a toothed edge of son lamellar body two sets of teeth positioned on either side of a mid-plane of this body and of which the teeth are intercalated with one another. These teeth are delimited between a flat external face, parallel to the mid plane of the lamellar body an internal face, also flat and parallel to the mid plane of the lamellar body and therefore have sharp edges, that can damage the coat of hair.

BRIEF SUMMARY OF THE INVENTION

The object of the invention is to provide a comb that on the contrary improves the treatment of the coat of hair during the grooming operation, while still respecting the well-being of the animal, by not causing any injuries or marks in the fur of the animal.

It therefore relates to a comb made from a lamellar body provided with means of fastening on a support for brushing with a handle and comprising, on a toothed edge, two sets of teeth positioned on either side of a mid-plane of the body and of which the teeth are intercalated with one another.

According to the invention, the teeth of the two sets of teeth are provided with anti-injury roundings at the tip thereof and over a portion of the length of the edges departing from the end thereof, and are delimited between a flat external face, parallel to the mid plane of the lamellar body, and a curved internal face, namely a main set of teeth with long teeth and a secondary set of teeth with shorter teeth and thinner than those of the main set of teeth.

In practice, the main set of teeth is assigned to the brushing of dense or thick fur, for example fur for cold seasons, while the secondary set of teeth is assigned to the brushing of less dense fur with finer hairs, or to the brushing of fur for hot seasons.

In any case, the engaging of the comb in the fur takes place without damage for the animal, even if the teeth come into contact with its skin, as their rounded ends and edges cannot generate any injury, contrary to metal combs with a machined set of teeth having sharp edges and tips.

When the brush is displaced in the fur of the animal, the first set of teeth coming into contact with the hairs through the displacement of the brush provides the brushing, by removing from the fur dead hairs, dead skin, dust and spikelets, while the second set of teeth reinforces the action by a double brushing on the fur, without touching the skin, and provides a "gentle" smoothing of the hairs, as soon as they are released by the other set of teeth.

In an embodiment, at least the teeth of the main set of teeth have a convex internal face that favours the sliding of the hairs.

In another embodiment, when the teeth of the main set of teeth have a convex internal face, those of the secondary set of teeth have a concave internal face.

This makes it possible to form on the teeth and between the teeth sloped plates which, according to the direction of displacement of the comb, receive dead hairs, dead skin, and dust and remove their presence from the fur by improving the effect of the brushing and the shine of the fur.

Advantageously, the comb is made by moulding metal or a plastic material.

This makes it possible to obtain identical combs of high quality, that do not require complex machining and of which the teeth have even rounded edges and rounded tips that cannot injure the skin of the animal.

In an embodiment, the teeth of each one of the two sets of teeth have a cross-section which goes from the circular shape to a rectangular shape with rounded edges moving from their end towards the blade body.

This arrangement favours contact and also improves the smoothing of the hairs by the flay faces of the toothgap.

BRIEF DESCRIPTION OF THE DRAWINGS

Other characteristics and advantages shall result from the following description, in reference to the annexed schematic drawing, showing several embodiments of this comb.

FIG. 1 is a front view in elevation of an embodiment of the comb viewed from the side of the secondary set of teeth for fine fur;

FIG. 2 is a diagrammatical view showing the change in the shape of the sections of the teeth of the two sets of teeth using sections made according to the sections S1 to S5 of FIG. 1;

FIG. 3 is a front view in elevation of another embodiment of the comb viewed from the side of the long set of teeth for thick fur;

DETAILED DESCRIPTION OF THE PREFERRED EMBODIMENTS

Figure 9:
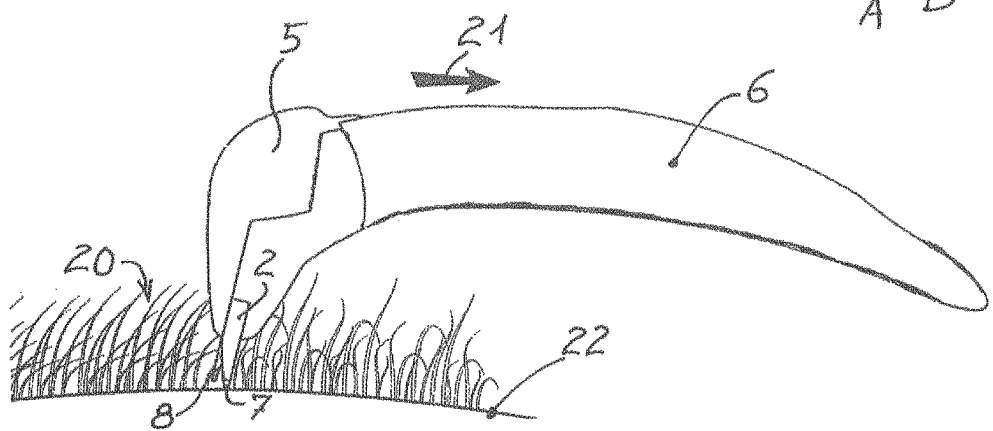
FIG. 9 is a side view in elevation of a brush provided with the comb according to the invention, during a brushing operation with the main set of teeth positioned at the front.

Generally and as shown in FIG. 1, the comb 1 according to the invention is comprised of a lamellar body 2 provided with in its heel means for fastening 3 or 4 on a head 5 with handle 6, visible in FIG. 9.

In the embodiment of the invention shown in the figures, the lamellar body 2 comprises a toothed edge formed by two sets of teeth, respectively, the main set A and secondary set B, positioned on either side of the mid plane P of the comb (FIGS. 4 and 5) and comprised of teeth 7 and 8. The teeth 7 of the main set of teeth A are intercalated with the teeth 8 of the secondary set of teeth B and are delimited, as they are, between a flat external face, respectively 9a and 9b, corresponding to the faces of the lamellar body, and a curved internal face, respectively 10a and 10b, formed at the end of the teeth. The faces 9a and 9b, 10a and 10b and the faces of toothgaps 11 are smooth and without asperities in such a way as to facilitate the sliding of the hairs against them.

This is obtained all the more so easily in that each lamellar body 2 with its comb with a double set of teeth A and B is obtained by moulding a material, such as metal or a plastic material, having a good sliding coefficient and a flexibility for avoiding tension in the coat of hair. In a manufacturing alternative the body and the combs are obtained by 3D printing.

Figure 4:
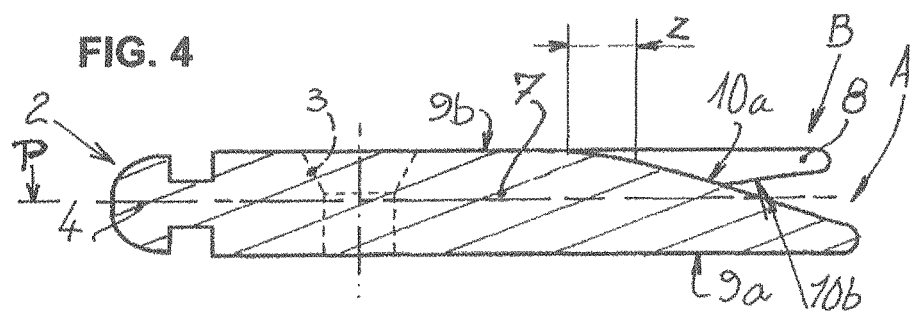
FIGS. 4 and 5 are cross-section views along IV-IV and V-V of FIG. 1, showing respectively a tooth from the main set of teeth for thick fur and a tooth from the secondary set of teeth for fine fur.
Figure 5:
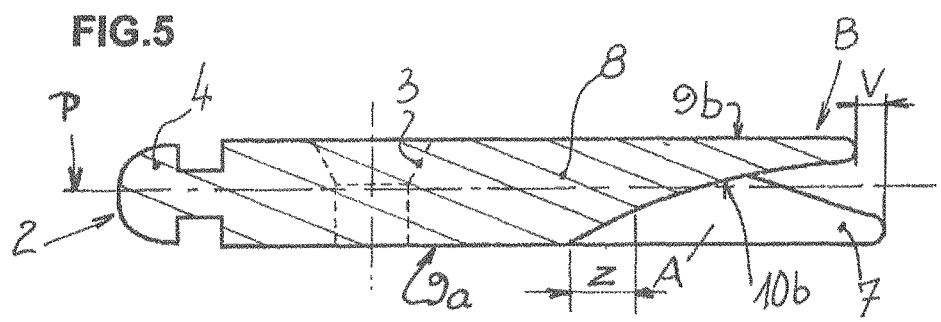

In the embodiment of FIG. 4, which shows a cross-section of a tooth 7 of the main set of teeth A, the internal face 10a of this tooth 7 is convex, while, in FIG. 5, the face 10b of a tooth 8 of the secondary set of teeth B is concave. These figures also show that the teeth 7 of the main set of teeth A are longer than those 8 of the secondary set of teeth B by a value V.

In this embodiment, the difference between the lengths of the sets of teeth A and B is about from 5 to 20% of the length of the longest tooth 7 of the set of teeth A. These dimensions can vary according to the targeted action sought.

Moreover, the length of the sets of teeth A and B is between half and two-fifths of the width of the lamellar body 2, according to the means of fastening of this lamellar body onto the brush body 5, namely by screws passing through the holes 3 made in the body 2 or by the engagement of a T-shaped tenon 4 of the body 2 in a groove of the brush body. These proportions can changer according to the type of brush used.

FIG. 2 which lists the sections S1 to S5 obtained by the cross-sections 1 to 5 of FIG. 1, shows that the cross-section of each one of the teeth 7 and 8 of the two sets of teeth A and B pass from a circular shape (in S1 and S2) to a square shape then rectangular with rounded edges (in S3 and S4), then not rounded (in S5) by moving from the rounded tip of each tooth towards its connection to the lamellar body 2. This characterises the presence of rounded ends then rounded edges extending over a portion of the length of the teeth, in order to not favour the pulling off or the sectioning of the hairs.

The junction of the teeth with the lamellar body 2 is without rounded edges, as shown in S5. This organisation forms a sloped plate Z which makes it possible to store the dead hairs combed. This zone Z also favours the cleaning and the storing of the dead hairs, by as such releasing the sets of teeth for optimum brushing.

FIG. 2 also shows that the cross-section of each one of the teeth 8 of the secondary set of teeth B is smaller than that of the teeth 7 of the main set of teeth A.

Figure 6:
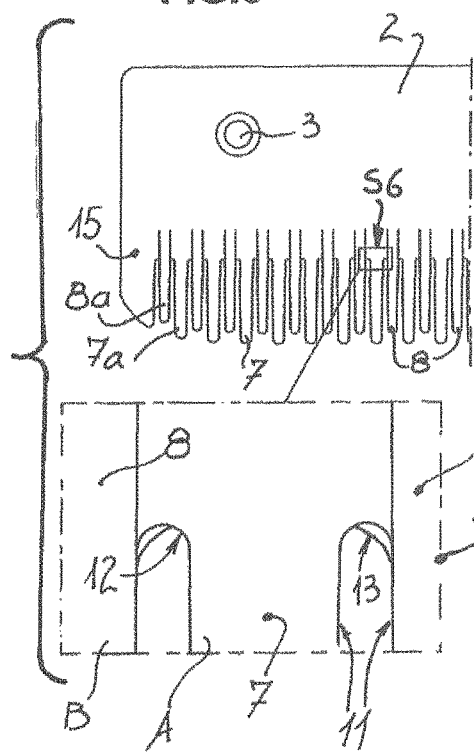
FIGS. 6 and 7 are partial views showing, on an enlarged scale the shapes of the toothgap bottoms between the main set of teeth and the secondary set of teeth.
Figure 7:
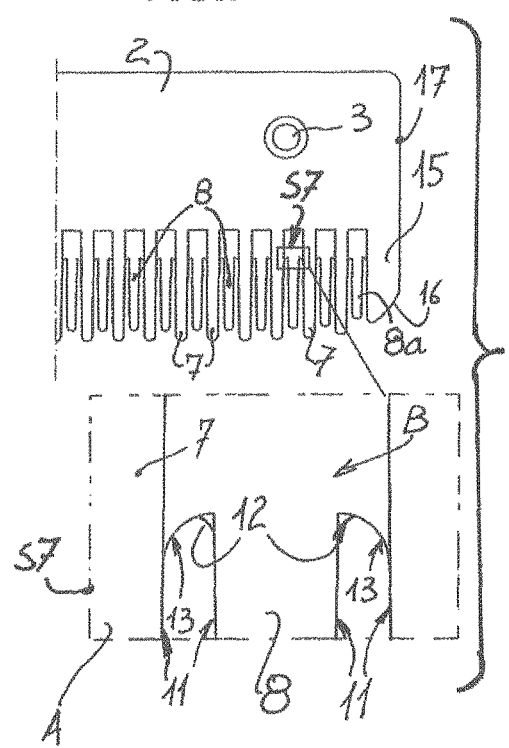
Figure 8:
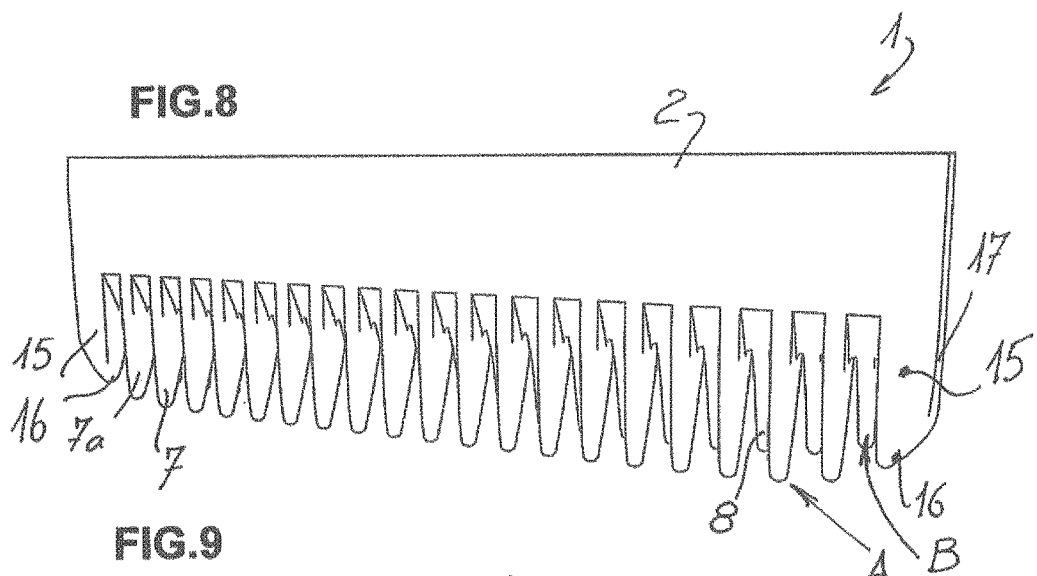
FIG. 8 is a perspective view of a comb viewed from the side of the main set of teeth.

FIGS. 6 and 7 show, through their enlarged sections S6 and S7 of the toothgap sets of teeth, respectively B and A, that the bottom of this toothgap has a section that varies, by moving transversally in the thickness of the comb, for example from the small teeth 8 towards the large teeth 7, from the semi-circular shape 12, of FIG. 6, to the shape of an arc of a circle 13 abutting against the flank of the tooth 8, as shown in FIG. 7. Each toothgap as such delimits a transversal corridor, collecting the hairs of the brushed fur by directing them towards the straight and flat lateral faces 11 at the base of the teeth favouring the removal of the dead hairs, dead skin, dust and spikelets, by smoothing these hairs.

As shown in FIGS. 1, 3 and 6 to 8, when the comb extends longitudinally beyond the ends of the sets of teeth A and B, it comprises two framing fingers 15 which each have a length less than those of the teeth 7 and 8 and which are provided with a rounded tip 16 and rounded edges 17. With the same purpose of not giving the comb the possibility of injuring the skin of the animal, the teeth 7a and 8a which are positioned against the framing fingers 15 have a length which decreases when moving towards these framing fingers.

Note that in order to best adapt to the size of the animals that can be brushed and groomed, for example from the Chihuahua to the Saint Bernard, the comb is provided in several sizes which are differentiated by the width of the sets of teeth and the length of the teeth. In addition, as the animals do not have the same density of fur, the combs are provided with different configurations that allow them to be used for different animals by adapting to thickness, and to the length of their coat of hair.

The description, which precedes, differentiates the sets of teeth A and B in a general way by adding "main" and "secondary" to them, purpose in the embodiment that follows these same sets of teeth are defined by their user, namely, "for thick fur" for the set of teeth A and "for fine fur" for the set of teeth B. As the coat of hair of the same animal can, according to the seasons, switch from thick fur to a more aerated fur, and inversely, the user of the brush can take advantage of the removability of the comb to turn it over on the head 5 of the brush and come into contact with the hairs by the set of teeth that best corresponds to the density of the fur.

Figure 10:
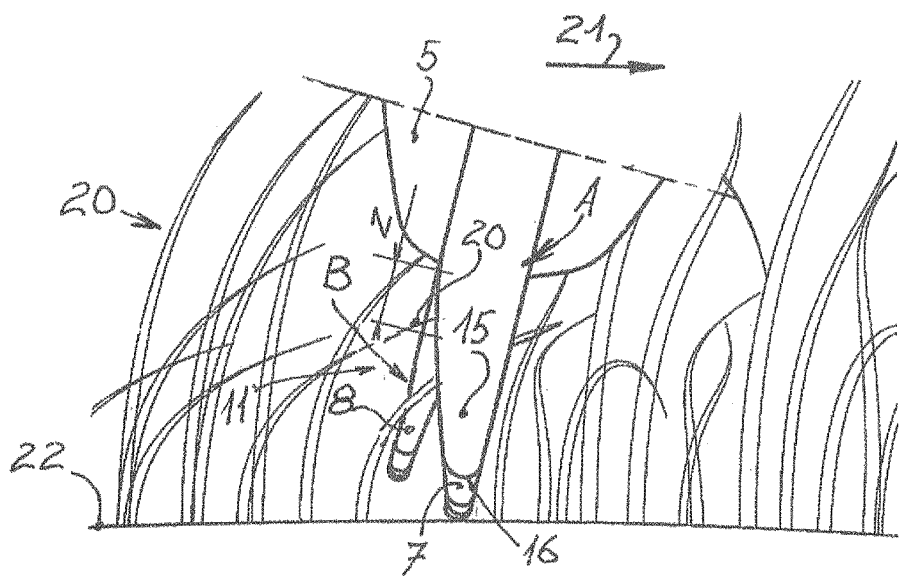
FIG. 10 is a partial view with a cross-section of the comb showing, on a very enlarged scale, the action of the sets of teeth on the coat of hair of an animal.

FIG. 9 shows a brush wherein the comb 2 is positioned in such a way that it is the main set of teeth A "for thick fur" that is in front and comes into contact with the hairs 20 when the brush is displaced according to the arrow 21, with the set of teeth B therefore being at the rear. With FIG. 10, it shows that the comb with its two sets of teeth, the main set of teeth positioned in front, is engaged without difficulty into the coat of hair and that its contact with the skin 22 is carried out via the rounded ends of its set of teeth 7, therefore without being able to injure the skin.

During the brushing movement the hairs 20 pass in the corridors of the toothgaps and which pushed then against the lateral faces 11 of the teeth 8 of the set of teeth B, faces which remove from the fur dead hairs, waste, dust and spikelets, by storing them on the zones Z, while still providing by the faces 11 a gentle smoothing of these hairs, as soon as they are released by the set of teeth A.

Figure 11:
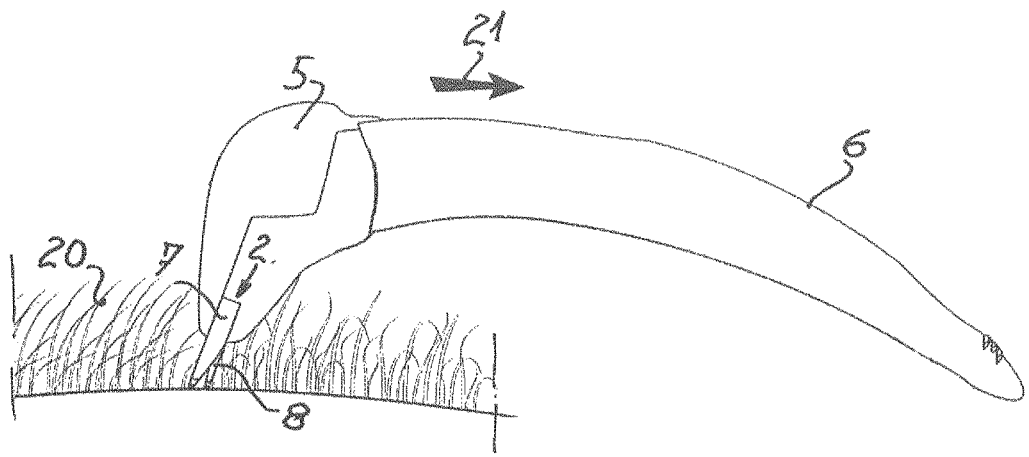
FIGS. 11 and 12 are views similar to FIGS. 9 and 10, but during a brushing operation with the secondary set of teeth positioned at the front.

In FIG. 11, the comb is shown on the head 5 of the brush in such a way that it is the secondary set of teeth B that is in the front and comes first against the hairs 20, when the handle is pulled according to the arrow 21.

Figure 12:
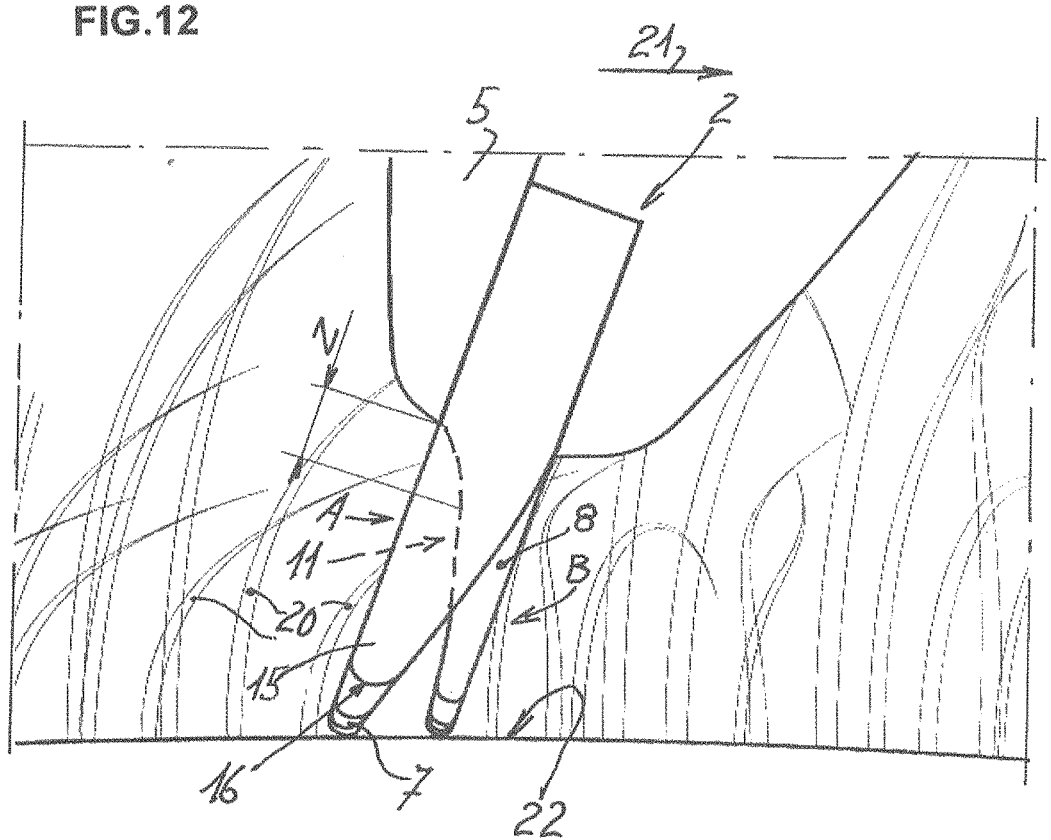

FIG. 12 shows that the brush is held manually with an inclination of the handle in such a way that the two sets of teeth A and B are in contact with the skin 22, in order to distribute the force of contact over the skin without risking injuring to it thanks to the rounded ends. As the pressure of the teeth on the skin is distributed over two rows the brushing feeling is gentler for the animal.

This position that brings the sets of teeth close to the skin in order to optimise brushing is specific for a coat of hair with fine hair and is therefore recommended for "sensitive" zones and zones with few hairs, such as the ears, paws, the neck and/or short hairs.

During the brushing movement the hairs 20 pass in the corridors of the toothgaps and which pushes them against the lateral faces 11 of the teeth 7 of the set of teeth A, faces that remove from the fur dead hairs, waste, dust and spikelets, while still providing a gentle smoothing of these hairs, as soon as they are released by the set of teeth B. As such, the main set of teeth A, positioned at the rear, has a "reinforcing" function of the brushing, and, with its convex shape and its sloped plates Z, groups together and retains the dead hairs, dead skin, dandruff, dust and spikelets, which can be extracted when the brush is removed from the coat of hair.

The invention claimed is:

1. A comb for manual brush for grooming animal fur, the comb comprising:
    a blade having a lamellar body provided with a fastening system configured to fasten on a support to brush with a handle; and
    on a toothed edge, two sets of teeth configured to penetrate into a coat of hair and positioned on either side of a mid-plane of the lamellar body,
    wherein the two sets of teeth are intercalated with one another,
    each of the teeth is provided with an anti-injury rounding at an end thereof and over a portion of the length of the edges starting from the end,
    the teeth are delimited between an external face that is planar and parallel to the mid plane of the lamellar body, and a curved internal face,
    the two sets of teeth include a main set of teeth with long teeth and a secondary set of teeth with shorter and thinner teeth than the teeth of the main set of teeth.

2. The comb for manual brush for grooming animal fur according to claim 1, wherein at least the teeth of the main set of teeth have a convex internal face, that favors the sliding of the hairs.

3. The comb for manual brush for grooming animal fur according to claim 1, wherein the teeth of the secondary set of teeth have a concave internal face.

4. The comb for manual brush for grooming animal fur according to claim 1, wherein the teeth of each one of the two sets of teeth have a cross-section which extends from a circular shape to a rectangular shape by moving from a respective end towards a heel of the lamellar body.

5. The comb for manual brush for grooming animal fur according to claim 1, wherein the internal faces and the external faces of the teeth, and the faces of toothgaps formed between the two sets of teeth, are smooth and without asperities.

6. The comb for manual brush for grooming animal fur according to claim 1, wherein the bottom of a toothgap between the teeth of the two sets of teeth has a shape that varies, moving from a side of the shorter and thinner teeth towards sides of the long teeth, from a semi-circular shape to a shape of an arc of a circle butting against a flank of the tooth, by delimiting a transversal corridor that collects dead hairs and impurities.

7. The comb for manual brush for grooming animal fur according to claim 1, wherein the teeth of the two sets of teeth extends over substantially ⅔ of a width of the lamellar body and the difference in lengths between the teeth of the main set of teeth and the teeth of the secondary set of teeth is between 5 and 20% of the length of the teeth of the set of teeth.

8. The comb for manual brush for grooming animal fur according to claim 1, wherein the lamellar body and the sets of teeth are formed by molding or 3D printing in a material that has a sliding coefficient and a flexibility that avoids tension in the coat of hair.

9. The comb for manual brush for grooming animal fur according to claim 8, wherein the material is metal.

10. The comb for manual brush for grooming animal fur according to claim 8, wherein the material is plastic.

11. The comb for manual brush for grooming animal fur according to claim 1, wherein the lamellar body extends longitudinally beyond the two sets of teeth by framing fingers having a rounded end and rounded edges and having a lesser length than the teeth of the two sets of teeth.

12. The comb for manual brush for grooming animal fur according to claim 11, wherein the teeth of the two sets of teeth positioned against the framing fingers have a length that decreases when moving towards the framing fingers.

* * * * *